United States Patent [19]
Wojewodzic

[11] Patent Number: 4,972,624
[45] Date of Patent: Nov. 27, 1990

[54] RIGID FISHING BLADE CONTROL ASSEMBLY

[76] Inventor: Joseph F. Wojewodzic, 10 Londonderry La., Essex Junction, Vt. 05452

[21] Appl. No.: 486,770

[22] Filed: Mar. 1, 1990

[51] Int. Cl.⁵ ...................... A01K 89/00; A01K 91/00
[52] U.S. Cl. .................................. 43/43.12; 43/43.13
[58] Field of Search .................... 43/43.12, 43.13, 27.4

[56] References Cited
U.S. PATENT DOCUMENTS

| 2,735,212 | 2/1956 | Baum | 43/43.12 |
| 2,769,271 | 11/1956 | Smith | 43/43.13 |
| 3,095,664 | 7/1963 | Nichols | 43/43.13 |
| 3,738,047 | 6/1973 | Tozer | 43/43.12 |
| 4,411,090 | 10/1983 | Seals | 43/43.13 |
| 4,854,072 | 8/1989 | Pecor | 43/43.12 |

Primary Examiner—Richard K. Seidel
Assistant Examiner—Rex E. Pelto
Attorney, Agent, or Firm—Thomas N. Neiman

[57] ABSTRACT

The assembly comprises a cable clamp that is connected directly to a fishing downrigger cable thereby making a semi-permanent connection that is affixed to the downrigger cable and the system weight. The clamp has a rigid control rod attached which has a series of blades strung along in series to attract attention of the fish. At various positions along the rigid control rod prior to the rearmost blade, a crosspiece with multiple connection vertical stabilizing units is positioned. This mechanism allows the fisherman to add to the unit as desired for their particular situation. The rigid control rod allows the fisherman to use oversized blades, if necessary. This design allows the fisherman to have the fishing line above the blades and have no fear of having tangled lines as the blade rod is kept rigid no matter what the situation is.

4 Claims, 2 Drawing Sheets

RIGID FISHING BLADE CONTROL ASSEMBLY

This invention pertains to fishing devices, and in particular to such fishing devices for use with a downrigger trolling system that has a cable clamp to attach a blade assembly to the downrigger cable and rigid control rod that the blades are attached to while keeping the fishing line separate from the blade assembly.

The field of sport fishing is one that has a large following and with the invention of the downrigger trolling system, the primary method used for sportfishing is trolling. In conjunction with the standard fishing equipment used for trolling, it is desirable to use a blade assembly to attract fish to your bait. The standard practice for rigging this blade system is to attach the fishing line and the blade system in series to the downrigger cable. When a fish hits the bait and hook, the fishing line and the blade assembly will release and allow the fisherman to reel in the fish. The difficulty that comes into play using this method of rigging is that the fisherman has to struggle, not only against the fish itself, but also against the excess weight and drag of the blade system which is considerable, even to the point of not knowing if there is actually a fish on the line.

Clearly, it is desirable for a trolling system that does not contain the limitations described above and at the same time is simple and practicle to operate. It is the object of this invention, then to set forth an improved rigid fishing blade control assembly which avoids the disadvantages limitations, above-recited, which obtain in prior fishing blade release assemblies.

It is also the object of this invention to teach a rigid fishing blade control assembly which is simple to install and use and that will enable the fisherman to easily have all the advantages of a fishing blade assembly, while minimizing the above-listed limitation. Particularly, it is the object of this invention to set forth a rigid fishing blade control assembly, for use when trolling with downrigger equipment, comprising cable clamping means; said cable clamping means having means for coupling to a downrigger cable; said clamping means having rigid control rod means attached thereto; blade means; said blade means comprise a plurality of flattened plates; said blades being connecting to said rigid control rod means at various points of said rigid control rod means; a crosspiece; at least one vertical stabilizing means being connected to said crosspiece; said crosspiece being affixed to said rigid control rod means at any desired position along said rigid control rod means prior to the rearmost of said blade means; and weight attaching means.

Further objects and features of this invention will become more apparent by reference to the following description taken in conjunction with the accompanying figures, in which.

Figure 1:
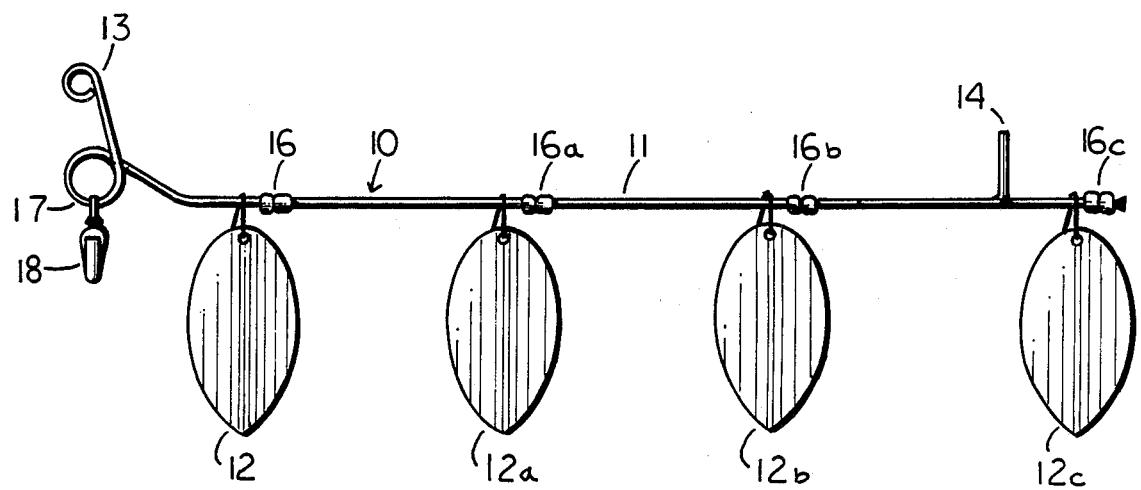
FIG. 1 is a side elevational view of the novel rigid fishing blade control assembly.
Figure 2:
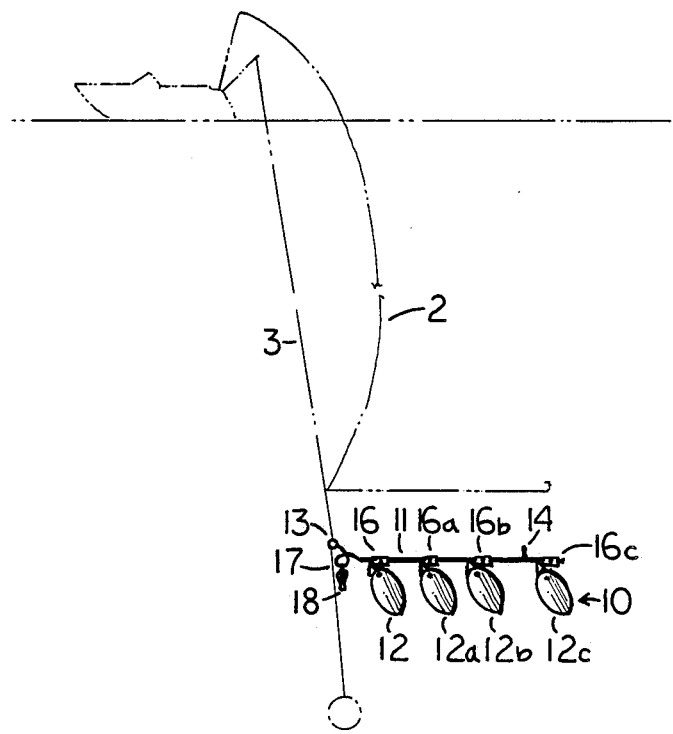
FIG. 2 is a perspective view thereof.
Figure 3:
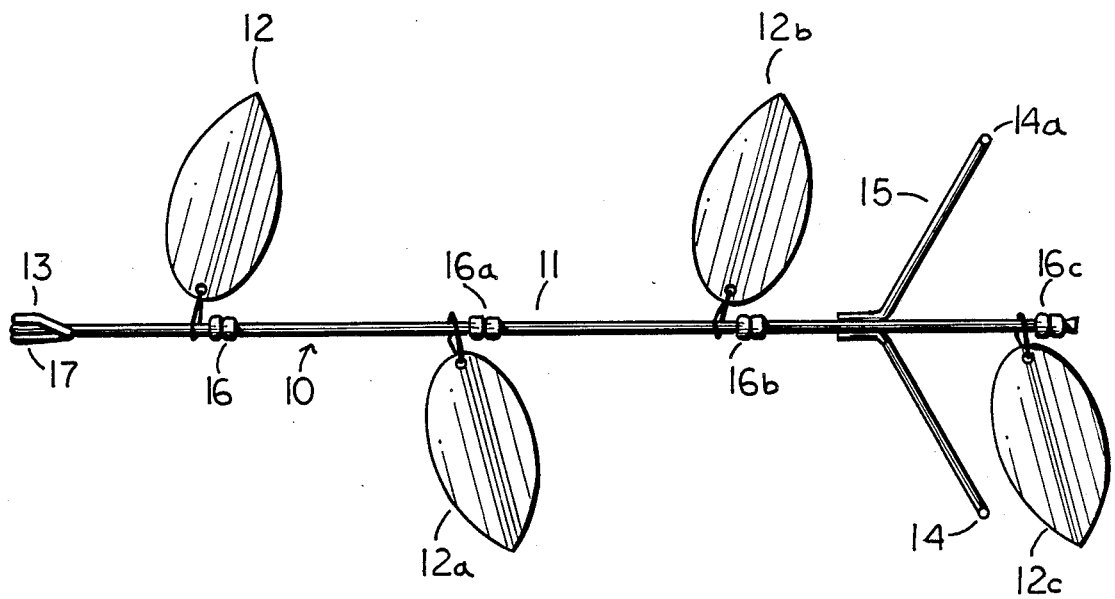
FIG. 3 is a top plan view thereof.
Figure 4:
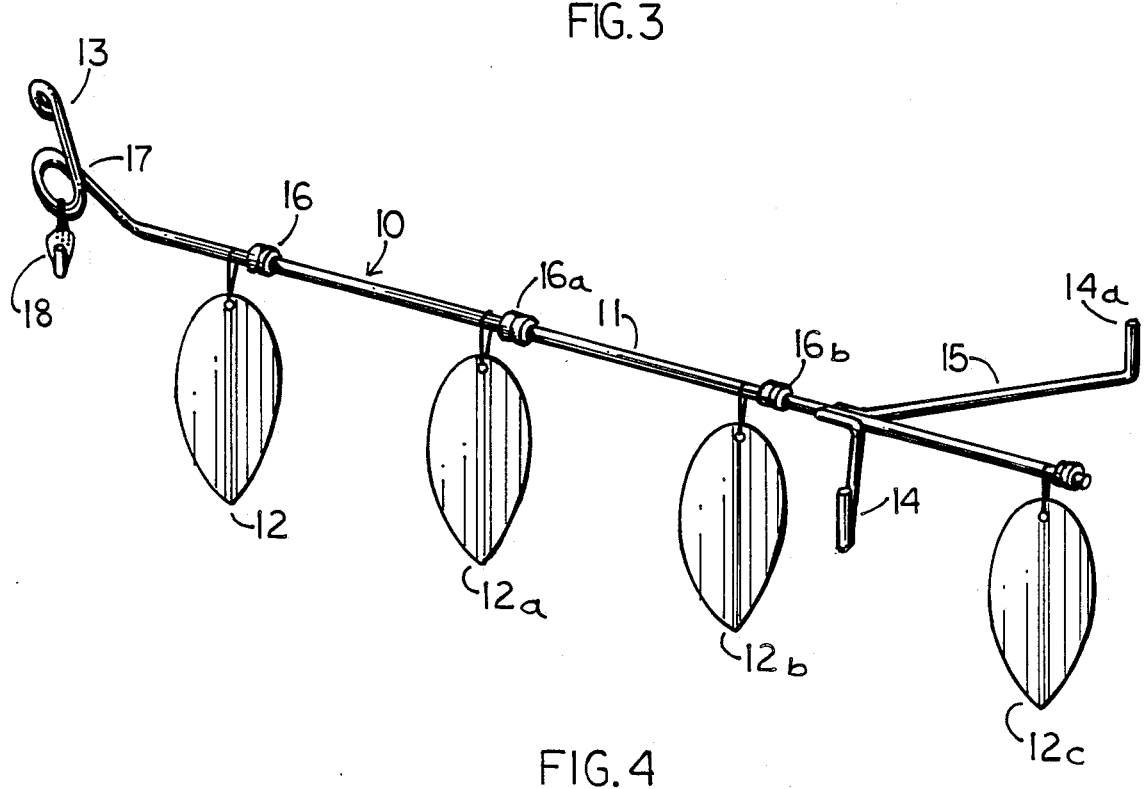
FIG. 4 is a perspective view thereof.

As shown in the figures, the fishing blade control assembly 10 is comprised of a clamp 18 that is attached to a lower loop 17 that provides a weight attachment platform. The downrigger cable 3 attaches to the upper loop 13 of the fishing blade control assembly 10. A number of blades 12, 12a, 12b and 12c are attached to the rigid blade control rod 11. Round beades 16, 16a, 16b and 16c are attached to the rigid blade control rod 11 at positions behind each of the blades. At various positions along the rigid blade control rod 11 as desired prior to the rearmost blade 12c, an angled crosspiece 15 having vertical posts 14 and 14a that are soldered on a crosspiece 15 is affixed to the rigid blade control rod 11. The fishing line 2 from the boat 1 is attached to the downrigger 3 at a position above the rigid blades control rod. The control rod is usually made of brass rod and the blades are designed to rotate around the blade wire and to reflect light in order to attract fish.

In operation, the fisherman will attach the clamp of the blade assembly to the downrigger cable at a desired position below the fishing line. The rigid blade control rod remains parallel with the lake surface and the lake bottom when adjusting height from one position to another, which will minimize drag on the downrigger motor. Having the fishing line release from the downrigger at a position above the rigid blade control rod minimizes the chances of fouling and entangling of the fishing line with the blades.

While I have described my invention in connection with specific embodiments thereof, it is clearly to be understood that this is done only by way of example and not as a limitation to the scope of my invention as set forth in the objects thereof and in the appended claims.

I claim:

1. A rigid fishing blade control assembly, for use when trolling with downrigger equipment, comprising:
   cable clamping means;
   said cable clamping means having means for coupling to a downrigger cable;
   said clamping means having rigid control rod means attached thereto;
   blade means;
   said blade means comprising a plurality of flattened plates;
   said blades connecting to said rigid control rod means at various points of said rigid control rod means;
   a crosspiece;
   at least one vertical stabilizing means being connected to said crosspiece;
   said crosspiece being affixed to said rigid control rod means at any desired position along said rigid control means prior to the rearmost of said blade means; and
   weight attaching means.

2. A rigid fishing blade control assembly, according to claim 1, wherein:
   said cable clamping means comprises a connection mechanism to enable the assembly to be attached directly to said downrigger cable for providing a semi-permanent connection to said cable.

3. A rigid fishing blade control assembly, according to claim 1, wherein:
   said blades comprise means for drawing attention of the fish.

4. A rigid fishing blade control assembly, according to claim 1, wherein:
   said weight attaching means comprises an connection device to attach a system weight to said fishing blade control assembly.

* * * * *

UNITED STATES PATENT AND TRADEMARK OFFICE
CERTIFICATE OF CORRECTION

PATENT NO. : 4,972,624
DATED : May 22, 1990
INVENTOR(S) : Robert G. Bryant, Jay J. Listinsky It is certified that error appears in the above-identified patent and that said Letters Patent is hereby corrected as shown below:

Insert the following sentences between lines 15 and 16 of Column 1.

"This invention was made with Government support under Grant No. CA-40699 awarded by the National Institutes of Health. The Government has certain rights in this invention."

Signed and Sealed this

Sixth Day of April, 1993

*Attest:*

STEPHEN G. KUNIN

*Attesting Officer*     Acting Commissioner of Patents and Trademarks